US010458241B2

(12) United States Patent
Kasperski et al.

(10) Patent No.: US 10,458,241 B2
(45) Date of Patent: Oct. 29, 2019

(54) SYSTEMS AND METHODS FOR POSITIONING MASKING PLUGS ON A COMPONENT

(71) Applicant: General Electric Company, Schenectady, NY (US)

(72) Inventors: Tyler Walton Kasperski, Greenville, SC (US); Jonathan Matthew Lomas, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 756 days.

(21) Appl. No.: 14/987,416

(22) Filed: Jan. 4, 2016

(65) Prior Publication Data

US 2017/0189989 A1 Jul. 6, 2017

(51) Int. Cl.

*B23K 11/00* (2006.01)
*B29C 65/48* (2006.01)
*F01D 5/00* (2006.01)
*F02C 3/04* (2006.01)
*F01D 25/28* (2006.01)

(52) U.S. Cl.

CPC .......... *F01D 5/005* (2013.01); *F01D 25/285* (2013.01); *F05D 2230/80* (2013.01); *F05D 2230/90* (2013.01)

(58) Field of Classification Search

CPC ... B23K 11/0053; B23K 11/362; B23K 11/31; B29C 65/48; B29L 2031/082; F01D 5/005; F01D 5/18; F01D 5/288; F02C 3/04; F05D 2230/80; F05D 2230/90; B23Q 3/15; B23Q 3/1543; B23Q 3/1546

USPC .............. 219/78.01, 91.2, 86.24, 86.32, 119; 279/128; 269/8

See application file for complete search history.

(56) References Cited

U.S. PATENT DOCUMENTS

| | | | | |
|---|---|---|---|---|
| 4,117,296 | A * | 9/1978 | Becker | B23K 11/163 219/113 |
| 7,195,622 | B2 | 3/2007 | Lindstrom et al. | |
| 8,722,144 | B2 | 5/2014 | Ohara | |
| 2004/0245221 | A1 * | 12/2004 | Schmitt | B23K 9/20 219/98 |
| 2006/0261046 | A1 * | 11/2006 | Scotchmer | B23K 11/3009 219/120 |
| 2012/0132624 | A1 * | 5/2012 | Aoyama | B23K 11/0053 219/117.1 |
| 2013/0212862 | A1 * | 8/2013 | Sleath | F01D 25/285 29/525.01 |

* cited by examiner

*Primary Examiner* — Dana Ross
*Assistant Examiner* — James F Sims, III
(74) *Attorney, Agent, or Firm* — Frank A. Landgraff; Charlotte C. Wilson; James W. Pemrick

(57) ABSTRACT

A tool for positioning a masking plug relative to a surface feature on a component is provided. The tool includes a body extending from a first end to an opposite second end. The second end is configured to couple to an attachment tool. The tool further includes a channel defined in the first end. The channel is sized to receive at least a portion of the masking plug therein such that rotational motion of the tool about a longitudinal axis is transferred to the masking plug. The tool is operable to releasably secure the masking plug to the first end.

14 Claims, 9 Drawing Sheets

SYSTEMS AND METHODS FOR POSITIONING MASKING PLUGS ON A COMPONENT

BACKGROUND

The present disclosure relates generally to rotary machines and, more specifically, to systems and methods for positioning masking plugs on a component of a rotary machine.

At least some known rotary machines, such as gas turbines, include components, such as turbine nozzles, rotor blade airfoils, and/or shrouds, formed from a substrate over which a coating is applied. At least some of such components include surface features, such as cooling apertures, that extend through the coating and into, and/or through, the substrate. Repair of some such components requires the coating to be removed from, and subsequently reapplied to, the substrate. Surface features previously formed in the substrate remain after the substrate has been repaired. However, in at least some cases, recoating the component may undesirably obstruct and/or obscure surface features located on the underlying substrate.

At least some known repair methods include positioning plugs over the surface features in the substrate prior to the coating being reapplied, such that the plugs inhibit the coating material from obstructing the surface features. However, where a large number of surface features are present on the component, a large amount of time and effort may be required to properly position a plug over each surface feature, and then to later remove the plugs after the coating is reapplied.

BRIEF DESCRIPTION

In one aspect, a tool for positioning a masking plug relative to a surface feature on a component is provided. The tool includes a body extending from a first end to an opposite second end. The second end is configured to couple to an attachment tool. The tool further includes a channel defined in the first end. The channel is sized to receive at least a portion of the masking plug therein such that rotational motion of the tool about a longitudinal axis is transferred to the masking plug. The tool is operable to releasably secure the masking plug to the first end.

In a further aspect, a system for use in positioning a masking plug relative to a surface feature on a component is provided. The system includes a masking plug including a first projection configured to extend within the surface feature. The system further includes a tool including a body configured to couple to an attachment tool. The tool further includes a channel defined in the body. The channel is sized to receive at least a portion of the masking plug such that rotation of the tool causes rotation of the masking plug. The tool is operable to releasably secure the masking plug to the body.

In another aspect, a method of positioning a masking plug relative to a surface feature on a component is provided. The method includes coupling an attachment tool to a tool including a channel therein. The tool extends from a first end to an opposite second end. The method further includes receiving at least a portion of the masking plug in the channel such that rotational motion of the tool causes rotation of the masking plug and such that the masking plug is releasable secure to the first end. The method additionally includes positioning the tool relative to the surface feature on the component.

DETAILED DESCRIPTION OF THE INVENTION

Figure 1:
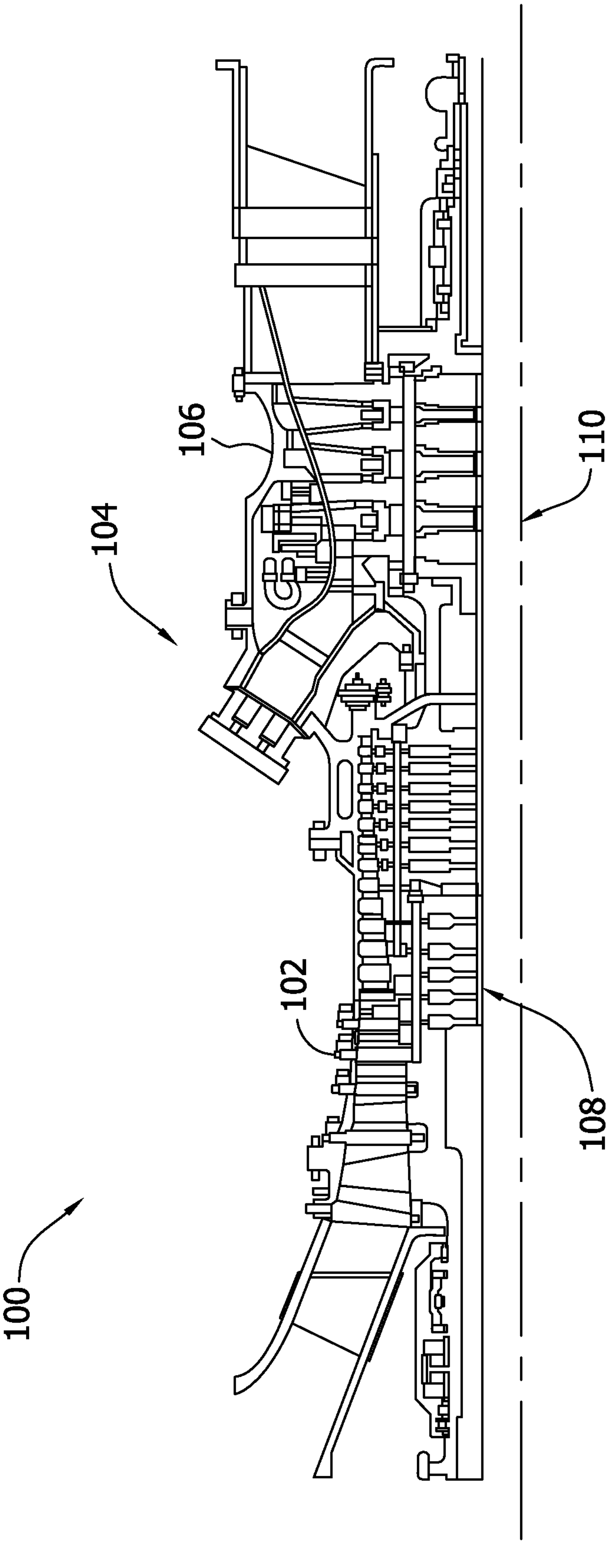
FIG. 1 is a schematic view of an exemplary rotary machine.

The exemplary tools and methods described herein overcome at least some of the disadvantages associated with known repair tools and methods for applying a coating material on a component including surface features. The embodiments described herein include a tool that includes a channel sized to receive at least a portion of a masking plug therein, such that rotational motion of the tool causes rotation of the masking plug. The tool is configured to couple to an attachment tool, and is further operable to selectively couple the masking plug to the component. In certain embodiments, the tool includes an aperture defined therein and positioned such that the masking plug may be releasably secured to the tool, when negative pressure is induced through the aperture. In each embodiment, the tool is configured to releasably couple the masking plug to a substrate of the component prior to a coating being applied to the substrate.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Approximating language may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be identified. Such ranges may be combined and/or interchanged, and include all the subranges contained therein unless context or language indicates otherwise.

Additionally, unless otherwise indicated, the terms “first,” “second,” etc. are used herein merely as labels, and are not intended to impose ordinal, positional, or hierarchical requirements on the items to which these terms refer. Moreover, reference to, for example, a “second” item does not require or preclude the existence of, for example, a “first” or lower-numbered item or a “third” or higher-numbered item.

As used herein, the terms “axial” and “axially” refer to directions and orientations extending substantially parallel to a longitudinal axis of a rotary machine. Moreover, the terms “radial” and radially” refer to directions and orientations extending substantially perpendicularly to the longitudinal axis of the turbomachine. In addition, as used herein, the terms “circumferential” and “circumferentially” refer to directions and orientations extending arcuately about the longitudinal axis of the turbomachine. The term “fluid” as used herein includes any medium or material that flows, including, but not limited to, air. As used herein, the term “component” refers to any structure within a rotary machine that includes surface features that may be obscured and/or blocked by coating material during reapplication of a coating following repair of the surface. In addition, although embodiments of the disclosure are described with reference to components of rotary machines, it should be understood that the scope of the disclosure encompasses any suitable component of any suitable structure for which the embodiments are enabled to function as described herein.

FIG. 1 is a schematic view of a rotary machine 100, i.e., a turbomachine. In the exemplary embodiment, rotary machine 100 is a gas turbine engine. Rotary machine 100 includes a compressor assembly 102. A combustor assembly 104 is coupled downstream from, and in flow communication with, compressor assembly 102, and a turbine assembly 106 is coupled downstream from, and in flow communication with, combustor assembly 104. Turbine assembly 106 is coupled to compressor assembly 102 via a rotor assembly 108. In operation, compressor assembly 102 compresses inlet air to higher pressures and temperatures prior to discharging compressed air towards combustor assembly 104. The compressed air is mixed with fuel and burned within combustor assembly 104 to generate combustion gases that are channeled downstream toward turbine assembly 106. As the combustion gases impinge turbine assembly 106, thermal energy is converted to mechanical rotational energy that is used to drive rotor assembly 108. Rotor assembly 108 rotates about rotary machine axis 110.

Figure 2:
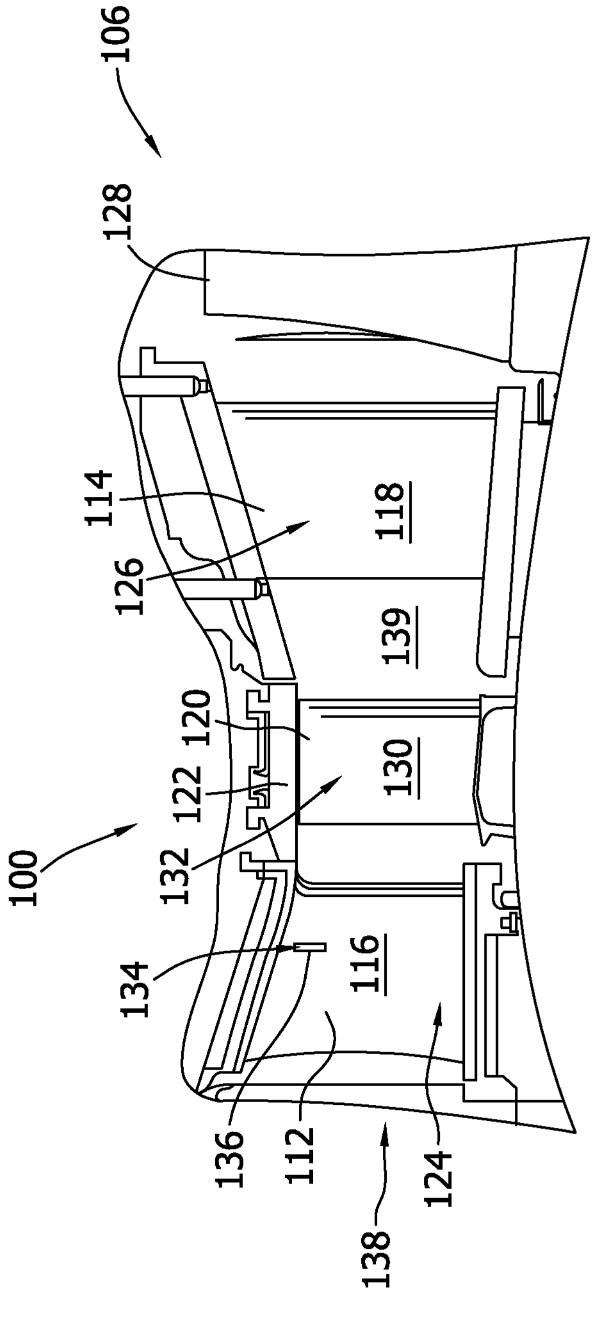
FIG. 2 is a side sectional view of a portion of an exemplary turbine assembly of the rotary machine shown in FIG. 1.

FIG. 2 is a side sectional view of a portion of an exemplary turbine assembly 106 of rotary machine 100. In the exemplary embodiment, turbine assembly 106 includes a plurality of first-stage nozzles 112 and a plurality of second-stage nozzles 114. Each plurality of nozzles 112 and 114 includes a plurality of circumferentially-spaced stator vanes, such as first and second stage stator vanes 116 and 118, respectively. A plurality of first-stage rotor blades 120 are coupled to rotor assembly 108 (shown in FIG. 1) for rotation between nozzles 112 and 114. In the exemplary embodiment, each rotor blade 120 includes an airfoil 130 and a tip shroud 122. In alternative embodiments, each of nozzles 112 and 114 and rotor blades 120 has any other suitable structure that enables turbine assembly 106 to function as described herein. Similarly, a plurality of second-stage rotor blades 128 are coupled to rotor assembly 108 for rotation between second-stage nozzles 114 and a third stage of nozzles (not shown). Although two stages of rotor blades and two stages of nozzles are illustrated, it should be understood that turbine assembly 106 includes any suitable number of stages that enables rotary machine 100 to function as described herein.

In the exemplary embodiment, a flow 138 of hot combustion gases is channeled through a rotor/stator cavity 139, exposing an outer surface 124 of nozzle 112, an outer surface 132 of airfoil 130, and an outer surface 126 of nozzle 114 to high temperatures and/or corrosive agents. To at least partially address such exposure, at least one of nozzle 112, airfoil 130, nozzle 114, and any other suitable hot component in turbine assembly 106 is provided with a suitable protective coating, such as, but not limited to, a ceramic and/or heat-resistant coating (not numbered). To further at least partially address such exposure, at least one of nozzle 112, airfoil 130, nozzle 114, and any other suitable hot component in turbine assembly 106 is provided with a cooling system 134. Cooling system 134 includes a suitable cooling air supply channel (not shown) coupled to at least one suitable subsurface passage (not shown) that terminates, for example, in at least one surface feature 136 in the at least one hot component. In the illustrated embodiment, for example, cooling system 134 is at least partially defined in nozzle 112, and surface feature 136 is defined in outer surface 124 of nozzle 112.

Figure 3:
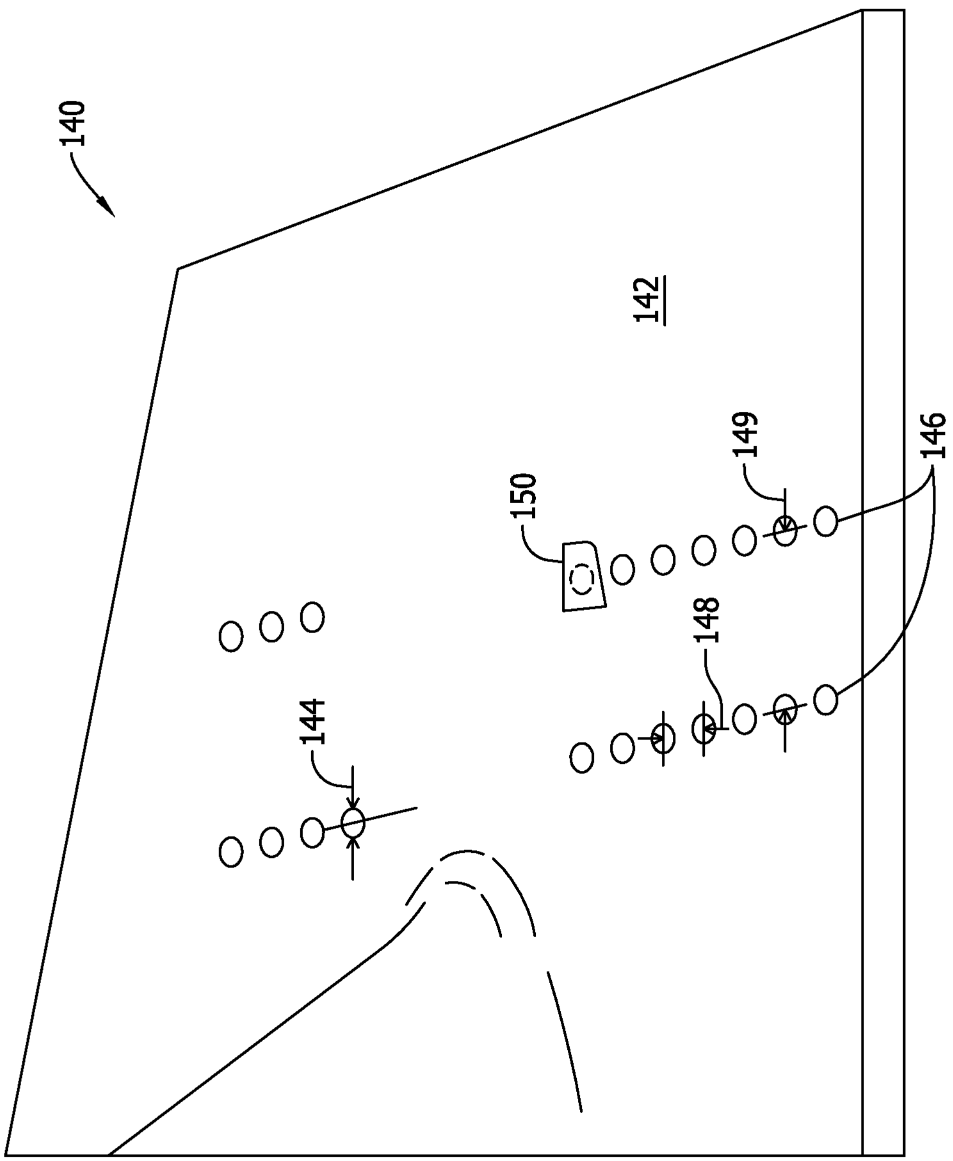
FIG. 3 is a perspective view of an exemplary component for use with the turbine assembly shown in FIG. 2, wherein the component includes an exemplary surface feature and where a masking plug is coupled to the component.

FIG. 3 is a perspective view of an exemplary component substrate 140 for use with turbine assembly 106 (shown in FIG. 2) and also illustrates component substrate 140 with an exemplary surface feature 146 and an exemplary masking plug 150 coupled to component substrate 140. In the exemplary embodiment, component substrate 140 is a substrate of nozzle 112 (shown in FIG. 2) with a surface feature 146. For example, a protective coating (not shown) is applied to component substrate 140 to form nozzle 112. In alternative embodiments, component substrate 140 is a substrate of any other turbine component that is exposed to combustion gases.

In the exemplary embodiment, component substrate 140 includes a plurality of surface features 146 defined in an outer surface 142 of component substrate 140. Moreover, in the exemplary embodiment, surface features 146 are sized substantially identically and each surface feature 146 has a substantially uniform diameter 144. Furthermore, in the exemplary embodiment, surface features 146 are uniformly spaced 148 and 149. In alternative embodiments, at least one surface feature 146 has a different diameter than other surface features 146 and/or at least some surface features 146 are not uniformly spaced.

In the exemplary embodiment, nozzle 112 is formed from component substrate 140 by applying the protective coating to outer surface 142. However, in order to form nozzle 112 surface features 146, the protective coating must be inhibited from entering and/or obstructing surface features 146 defined in component substrate 140. In the exemplary embodiment, at least one masking plug 150 is coupled to surface feature 146 of component substrate 140 prior to the protective coating being applied to outer surface 142.

Figure 4:
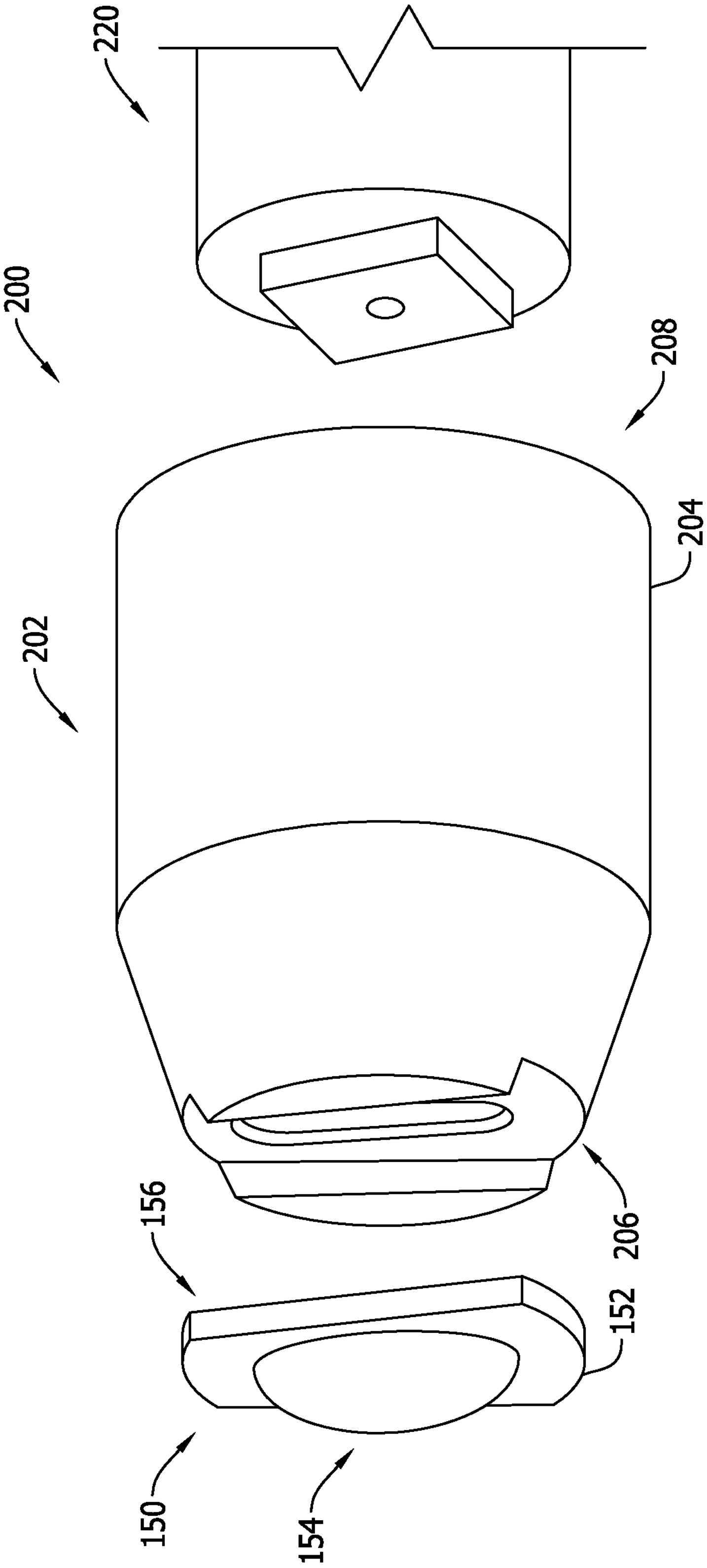
FIG. 4 is an exploded perspective view of an exemplary plug positioning system that may be used to selectively position the masking plug on the component shown in FIG. 3.

FIG. 4 is an exploded perspective view of an exemplary plug positioning system 200 that may be used to selectively position masking plug 150 on component substrate 140 (shown in FIG. 3). System 200 includes a masking plug 150 and a tool 202 that is operable to releasably secure masking plug 150 to a first end 206 of tool 202. Masking plug 150 may be removably coupled to outer surface 142 during coating of component substrate 140 using system 200.

In the exemplary embodiment, masking plug 150 includes a body 152, a first projection 154 extending outwardly from body 152, and a second projection 156 extending outwardly from body 152 in an opposite direction than first projection 154. First projection 154 is sized to extend partially into surface feature 146 (shown in FIG. 3) and, more specifically, to orient masking plug 150 with respect to surface feature 146, such that masking plug 150 facilitates substantially preventing the protective coating from entering and/or obstructing surface feature 146. In the exemplary embodiment, body 152 has a substantially polygonal shape, and first projection 154 has a hemisphere shape. In alternative embodiments, each of body 152 and first projection 154 has any suitable shape that enables masking plug 150 to function as described herein.

Second projection 156 of masking plug 150 may be releasably secured to first end 206 of tool 202, as will be described further herein. In the exemplary embodiment, second projection 156 has a shape that is substantially complementary to a first end 206 of tool 202, such that second projection 156 is at least partially receivable within first end 206 of tool 202. In alternative embodiments, second projection 156 has any other suitable shape that enables masking plug 150 to function as described herein.

Tool 202 is removably coupleable to an attachment tool 220. More specifically, in the exemplary embodiment, a second end 208 of tool 202 is removably coupleable to attachment tool 220, as will be described in more detail herein. In alternative embodiments, tool 202 is removably coupleable to attachment tool 220 in any other suitable fashion that enables plug positioning system 200 to function as described herein.

In the exemplary embodiment, attachment tool 220 is selectively operable to move tool 202 in a plurality of directions. More specifically, attachment tool 220 is operable to translate and orient tool 202 relative to outer surface 142 (shown in FIG. 3), and to rotate tool 202 about a longitudinal axis 226 (shown in FIG. 5) of tool 202. In certain embodiments, attachment tool 220 is an end effector of a suitable robotic device (not shown) and is automatically operable by the robotic device. Additionally or alternatively, attachment tool 220 may be manually operable.

Figure 5:
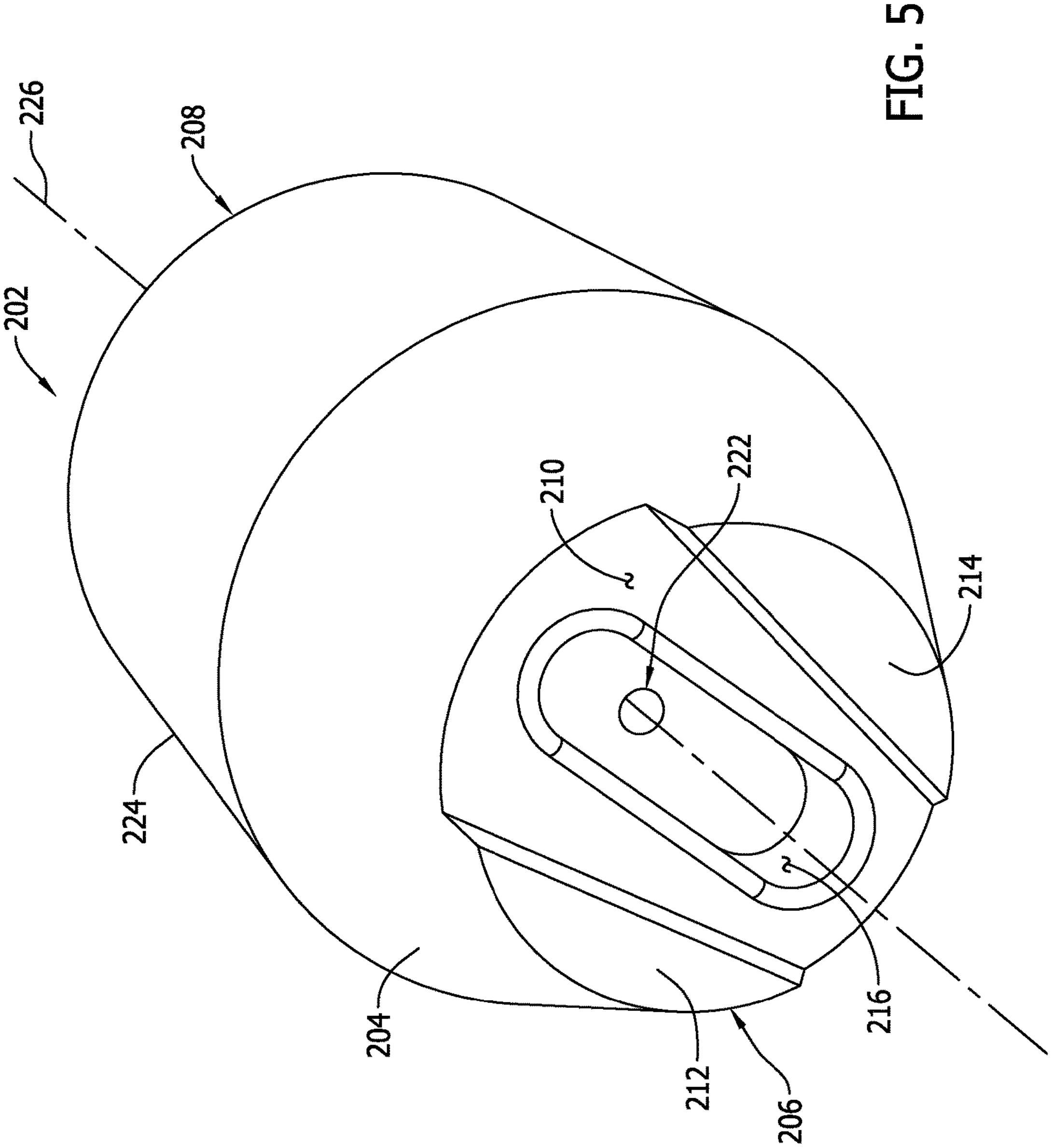
FIG. 5 is a perspective view of an exemplary tool that may be used with the system shown in FIG. 4.

FIG. 5 is a perspective view of an exemplary embodiment of tool 202 that may be used with system 200 (shown in FIG. 4). In the exemplary embodiment, tool 202 includes a substantially cylindrical body 204 extending from first end 206 to second end 208. In alternative embodiments, body 204 has any other suitable shape that enables tool 202 to function as described herein. Body 204 defines an exterior surface 224 of tool 202.

In the exemplary embodiment, a channel 210 is defined in first end 206. Channel 210 is sized and oriented to receive at least a portion of masking plug 150, such that rotational motion of tool 202 about longitudinal axis 226 is transferred to masking plug 150. For example, in the exemplary embodiment, channel 210 has a shape that substantially mirrors a perimeter of body 152 of masking plug 150 (shown in FIG. 4). More specifically, channel 210 is bounded by a pair of opposing side walls 212 and 214 that are complementary to corresponding opposing sides of the perimeter of body 152 of masking plug 150, such that rotation of tool 202 causes rotation of masking plug 150 by channel side walls 212 and/or 214. In alternative embodiments, channel 210 has any other suitable shape that enables tool 202 to function as described herein.

In the exemplary embodiment, a recess 216 is defined within channel 210 and in flow communication with channel 210. Recess 216 is sized to receive a perimeter of second projection 156 of masking plug 150 (shown in FIG. 4), such that rotational motion of tool 202 about longitudinal axis 226 causes rotation of masking plug 150. In alternative embodiments, tool 202 does not include recess 216.

Figure 6:
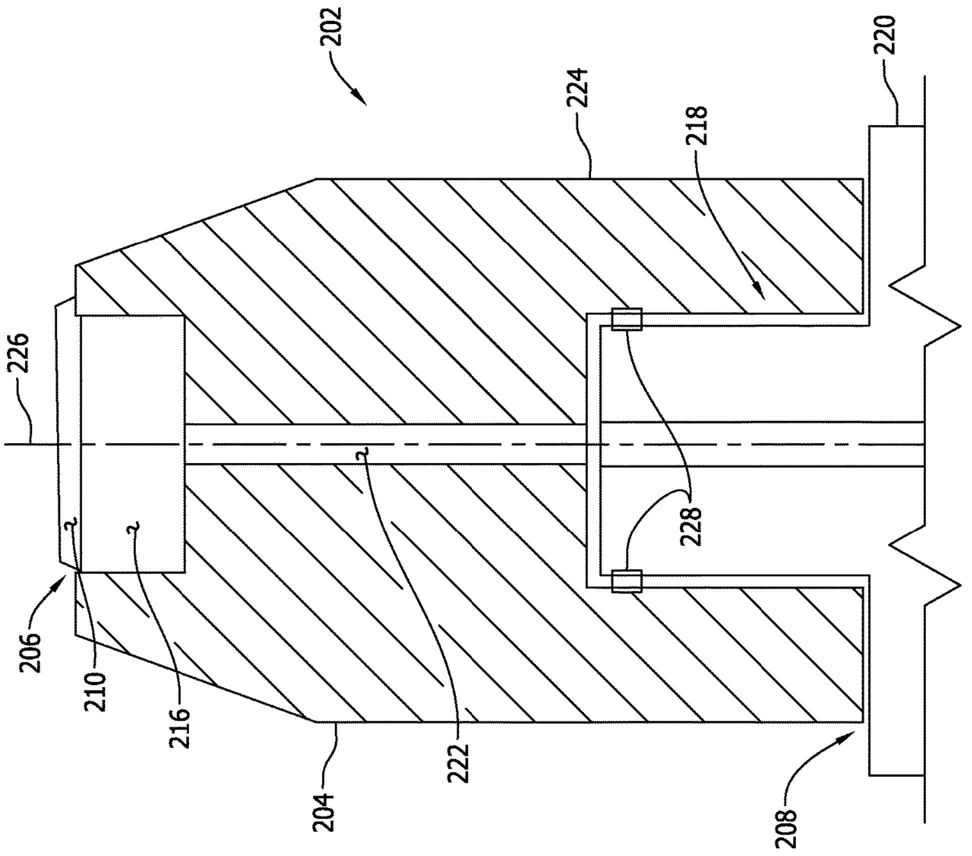
FIG. 6 is a side cross-sectional view of the tool shown in FIG. 5 and coupled to an exemplary attachment tool.

FIG. 6 is a side cross-sectional view of tool 202 (shown in FIG. 5) coupled to an exemplary embodiment of attachment tool 220 of plug positioning system 200. In the exemplary embodiment, body 204 includes a body bore 218 defined within second end 208 and sized and oriented to receive attachment tool 220, such that rotational motion of attachment tool 220 about longitudinal axis 226 is transferred to tool 202. For example, in the exemplary embodiment, body bore 218 has a substantially square shape that is complementary to a perimeter of attachment tool 220. In alternative embodiments, body bore 218 has any other suitable shape that enables tool 202 to function as described herein. In other alternative embodiments, rather than body bore 218 defined in tool 202 second end 208, second end 208 includes a projection (not shown) sized and oriented to be received by attachment tool 220, such that rotational motion of attachment tool 220 about longitudinal axis 226 is transferred to tool 202.

In the exemplary embodiment, an aperture 222 is defined within body 204 and in flow communication with first end 206 and second end 208. More specifically, in the exemplary embodiment, aperture 222 extends generally parallel to longitudinal axis 226 between, and in flow communication with, channel 210 and body bore 218. First end 206 of tool 202 is sized to secure masking plug 150 to tool 202 in response to a negative pressure induced within aperture 222, and to decouple tool 202 from masking plug 150 in response to a positive pressure induced within aperture 222, as will be described below.

In the exemplary embodiment, attachment tool 220 is suitably operable to selectively induce each of a negative pressure and a positive pressure within aperture 222 of tool 202. In operation, to secure masking plug 150 (shown in FIG. 4) to tool 202, second projection 156 of masking plug 150 is positioned within channel 210, and attachment tool 220 is selectively operated to induce a negative pressure in aperture 222. The negative pressure within aperture 222, which is in flow communication with channel 210, tends to secure masking plug 150 to tool 202. More specifically, in the exemplary embodiment, attachment tool 220 coupled within body bore 218 induces a relative vacuum though aperture 222, recess 216, and channel 210 creating a suction force on second projection 156 of masking plug 150. The suction force secures masking plug 150 to tool 202, such that masking plug 150 is movable with tool 202.

Further in operation, to release masking plug 150 (shown in FIG. 4) from tool 202, attachment tool 220 is selectively operated to induce a positive pressure in aperture 222. The positive pressure within aperture 222 tends to release masking plug 150 from channel 210 of tool 202. More specifically, in the exemplary embodiment, attachment tool 220 coupled within body bore 218 induces a relative positive pressure though aperture 222, recess 216, and channel 210 to create a blowing force on second projection 156 of masking plug 150. The blowing force releases masking plug 150 from tool 202.

With reference to FIGS. 3, 4, and 6, system 200 is operable to releasably couple masking plug 150 to component substrate 140 at surface feature 146, for example, prior to a coating being reapplied to component substrate 140. In operation, tool 202 is secured to second projection 156 of masking plug 150, as described above, and attachment tool 220 is selectively operated to translate and orient tool 202 relative to outer surface 142 such that first projection 154 is received within surface feature 146 and masking plug 150 masks surface feature 146. The securement of masking plug 150 to tool 202, for example through selectively inducing negative pressure through aperture 222, enables attachment tool 220 to position masking plug 150 throughout any suitable combinations of movement and orientations without masking plug 150 prematurely releasing from attachment tool 220.

In the exemplary embodiment, tool 202 also is selectively operable to releasably couple masking plug 150 to component substrate 140. For example, coupling masking plug 150 to component substrate 140 facilitates maintaining masking plug 150 in the selected masking position during a coating process of component substrate 140, thus further facilitating inhibition of the coating from entering and/or obstructing surface feature 146.

More specifically, in the exemplary embodiment, at least a portion of surface 224 of body 204 is coated with an electrically-conductive material, such that tool 202 is operable to weld masking plug 150 to component substrate 140. For example, at least a portion of surface 224 is formed from an electrically-conductive coating applied to body 204. In the exemplary embodiment, surface 224 includes a highly conductive copper plated material. In alternative embodiments, surface 224 includes any other suitable highly conductive material that conducts electric current and enables tool 202 to function as described herein such as, but not limited to, brass, copper, bronze, and steel. In addition, masking plug 150 is at least partially formed from a material that becomes coupled to component substrate 140 in response to an electric current. For example, masking plug 150 is a plastic material that heats under electric current and adheres to component substrate 140. In alternative embodiments, masking plug 150 includes any other suitable material that enables tool 202 to function as described herein.

Further in the exemplary embodiment, attachment tool 220 is operable to selectively apply an electric current to surface 224 of body 204. For example, in the exemplary embodiment, attachment tool 220 includes electrodes 228 configured to selectively apply an electrical current to body 204 when second end 208 is coupled to attachment tool 220. The electric current is conducted through surface 224, masking plug 150, and component substrate 140, causing masking plug 150 to become welded to component substrate 140. The highly conductive coating is operable to weld masking plug 150 to component substrate 140 without welding body 204 to component substrate 140.

In the exemplary embodiment, tool 202 also is selectively operable to decouple masking plug 150 from component substrate 140. For example, after the coating is reapplied to component substrate 140, masking plug 150 is decoupled and removed from component substrate 140 to uncover surface feature 146 (shown in FIG. 3) of the coated component.

More specifically, in the exemplary embodiment, attachment tool 220 is selectively operated to translate and orient tool 202 relative to outer surface 142 such that channel 210 of tool 202 is secured to second projection 156 of masking plug 150. Attachment tool 220 is then selectively operated to rotate tool 202 about longitudinal axis 226. Tool 202 urges masking plug 150 to rotate with tool 202, as described above, thereby tending to decouple the weld and/or other attachment between masking plug 150 and stationary component substrate 140. In certain embodiments, attachment tool 220 is further selectively operated to move masking plug 150 away from outer surface 142 without damaging the coating. For example, attachment tool 220 is selectively operated to induce negative pressure to aperture 222, such that masking plug 150 remains secured to tool 202 after decoupling from component substrate 140, and attachment tool 220 is selectively operated to translate and orient tool 202 relative to outer surface 142 to move masking plug 150 away from outer surface 142.

Figure 7:
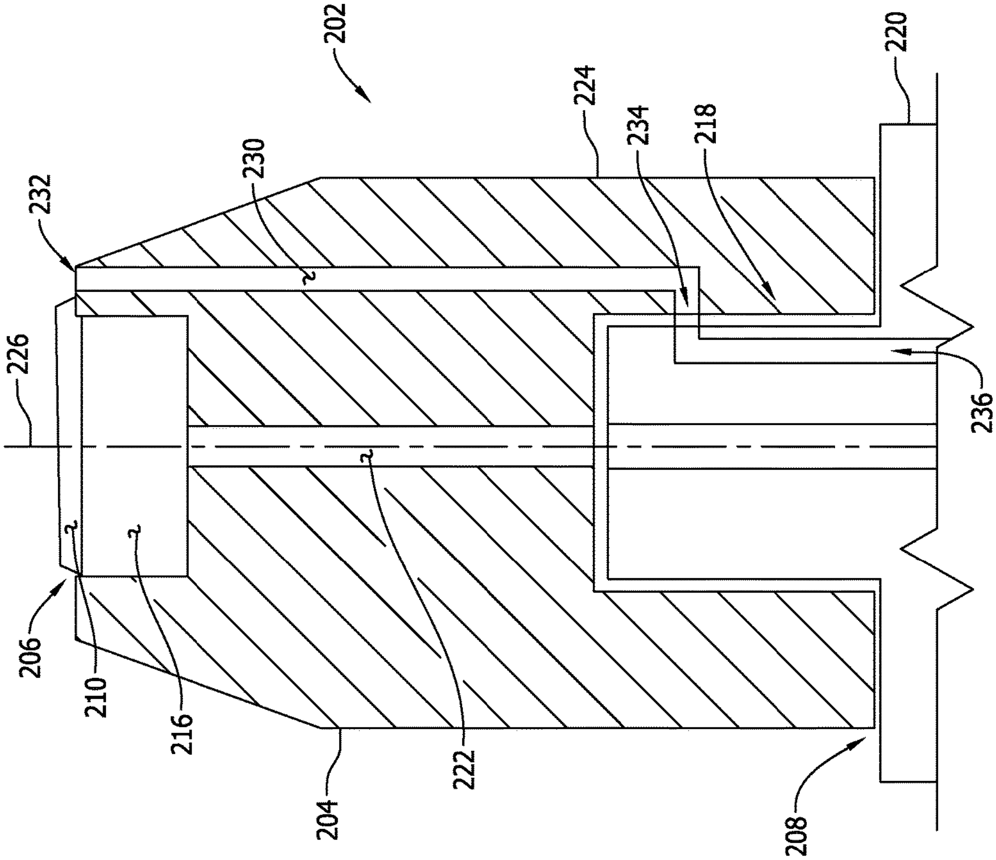
FIG. 7 is a side cross-sectional view of another exemplary tool that may be used with the system shown in FIG. 4.

FIG. 7 is a side cross-sectional view of another exemplary embodiment of tool 202 that may be used with system 200 (shown in FIG. 4). In this embodiment, tool 202 is coupled to another exemplary embodiment of attachment tool 220. With reference to FIGS. 3, 4, and 7, the exemplary embodiment of tool 202 and attachment tool 220 are substantially identical to the embodiment described above, except as described herein. For example, tool 202 includes body 204, channel 210 defined at first end 206, body bore 218 defined at second end 208, and aperture 222 (now a first aperture 222) defined within body 204, as described above with respect to the previously described embodiment. However, in this exemplary embodiment, tool 202 is selectively operable to couple masking plug 150 to component substrate 140 by flowing a suitable adhesive, such as a bonding resin, prior to the coating being applied to component substrate 140.

For example, in the exemplary embodiment, a second aperture 230 is defined within body 204. A first end 232 of second aperture 230 is defined in first end 206 of tool 202 and extends therethrough, and a second end 234 of second aperture 230 is defined is in body bore 218 of tool 202 and extends therethrough. Moreover, attachment tool 220 includes a supply aperture 236 configured to couple in flow communication with second end 234 when attachment tool 220 is received within body bore 218. Attachment tool 220 is selectively operable to channel adhesive from a suitable source through supply aperture 236 and into second end 234 of second aperture 230.

In operation, tool 202 is coupled to second projection 156 of masking plug 150 by selectively operating attachment tool 220 to induce a negative pressure to first aperture 222, and attachment tool 220 is selectively operated to translate and orient tool 202 relative to outer surface 142 such that first projection 154 is received within surface feature 146 and masking plug 150 masks surface feature 146, as described above with respect to the first embodiment. Attachment tool 220 also is selectively operated to flow adhesive through supply aperture 236 and into second aperture 230, such that adhesive flows through second aperture 230 and out first end 232 of second aperture 230, and thus spreads onto masking plug body 152 and component substrate 140. The adhesive quickly sets sufficiently to couple masking plug 150 to component substrate 140. Tool 202 also is selectively operable to uncouple masking plug 150 from component substrate 140, as described above. For example, after the coating is reapplied to component substrate 140, masking plug 150 is decoupled and removed from component substrate 140 to uncover surface feature 146 (shown in FIG. 3) of the coated component, as described above with respect to the first embodiment.

Figure 8:
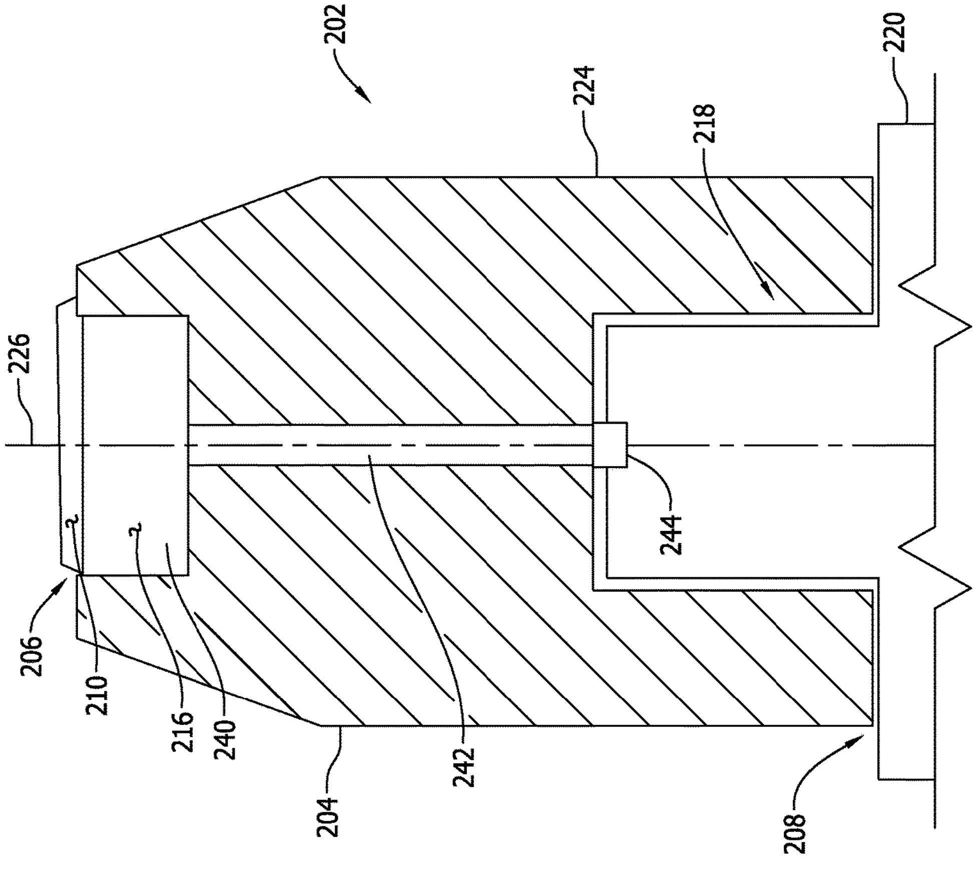
FIG. 8 is a side cross-sectional view of a further exemplary tool that may be used with the system shown in FIG. 4.

FIG. 8 is a side cross-sectional view of a further exemplary embodiment of tool 202 that may be used with system 200 (shown in FIG. 4). In this embodiment, tool 202 is coupled to a further exemplary embodiment of attachment tool 220. With reference to FIGS. 3, 4, and 8, the exemplary embodiment of tool 202 and attachment tool 220 are substantially identical to the embodiments described above, except as described herein. For example, tool 202 includes body 204, channel 210 defined at first end 206, and body bore 218 defined at second end 208, as described above with respect to the previously described embodiments. However, in this exemplary embodiment, instead of aperture 222 defined in body 204, tool 202 includes an electromagnetic material 240 adjacent channel 210, such as but not limited to within recess 216. Tool 202 further includes a conductive coupling 242 coupled between electromagnetic material 240 and body bore 218. Moreover, second projection 156 of masking plug 150 includes a material, such as a metallic material, that is attractable by a magnetic force, and attachment tool 220 includes an electrical connection 244 operable to selectively induce an electric current to conductive coupling 242 of tool 202. Thus, tool 202 is selectively operable to releasably secure masking plug 150 to tool 202 via an electromagnetic force.

In operation, to secure masking plug 150 to tool 202, second projection 156 of masking plug 150 is positioned within channel 210, and electrical connection 244 of attachment tool 220 is selectively operated to induce an electric current to conductive coupling 242 of tool 202. The electric current is supplied to electromagnetic material 240, which is responsive to the electric current to produce an electromagnetic force that tends to secure the magnetically attractable material of masking plug 150 to tool 202, such that masking plug 150 is movable with tool 202.

Further in operation, to decouple masking plug 150 from tool 202, electrical connection 244 of attachment tool 220 is selectively operated to remove the electric current to conductive coupling 242 of tool 202. The electromagnetic field generated by electromagnetic material 240 dissipates, removing the attractive force on masking plug 150 and facilitating the release of masking plug 150 from tool 202.

Although not shown in FIG. 8, in certain embodiments, the embodiment further is configured to at least one of weld masking plug 150 to component substrate 140 using electrodes 228 (shown in FIG. 6), to secure masking plug 150 to component substrate 140 using adhesive supplied through second aperture 230 (shown in FIG. 7), and to releasably secure masking plug 150 to component substrate 140 in any other suitable fashion that enables plug positioning system 200 to function as described herein.

Additionally, although systems for securing and releasing masking plug 150 from tool 202, such as inducing a negative pressure and a positive pressure within aperture 222, as illustrated in FIGS. 6 and 7, and inducing an electric current to electromagnetic material 240, as illustrated in FIG. 8, as well as systems for coupling and uncoupling masking plug 150 from component substrate 140, such as welding using electrodes 228, as illustrated in FIG. 6, and spreading adhesive through second aperture 230, as illustrated in FIG. 7, are illustrated as implemented in separate embodiments of tool 202 in FIGS. 6-8, it should be understood, that, in alternative embodiments, tool 202 includes all of the systems described herein such that a single tool 202 facilitates use in a plurality of applications. In yet additional embodiments, tool 202 includes any combination of the systems described herein. For example, in some such embodiments, tool 202 includes both systems for securing and releasing masking plug 150 from tool 202, such as inducing a negative pressure and a positive pressure within aperture 222, as illustrated in FIGS. 6 and 7, and inducing an electric current to electromagnetic material 240, as illustrated in FIG. 8, such that a single tool 202 facilitates use in a plurality of applications, such as with masking plugs 150 formed from various magnetic or non-magnetic materials. Additionally, in other such embodiments, tool 202 includes both systems for coupling and uncoupling masking plug 150 from component substrate 140, such as welding using electrodes 228, as illustrated in FIG. 6, and spreading adhesive through second aperture 230, as illustrated in FIG. 7, such that a single tool facilitates use in a plurality of applications, such as with masking plugs 150 formed from various weldable or adhesiveable materials.

Figure 9:
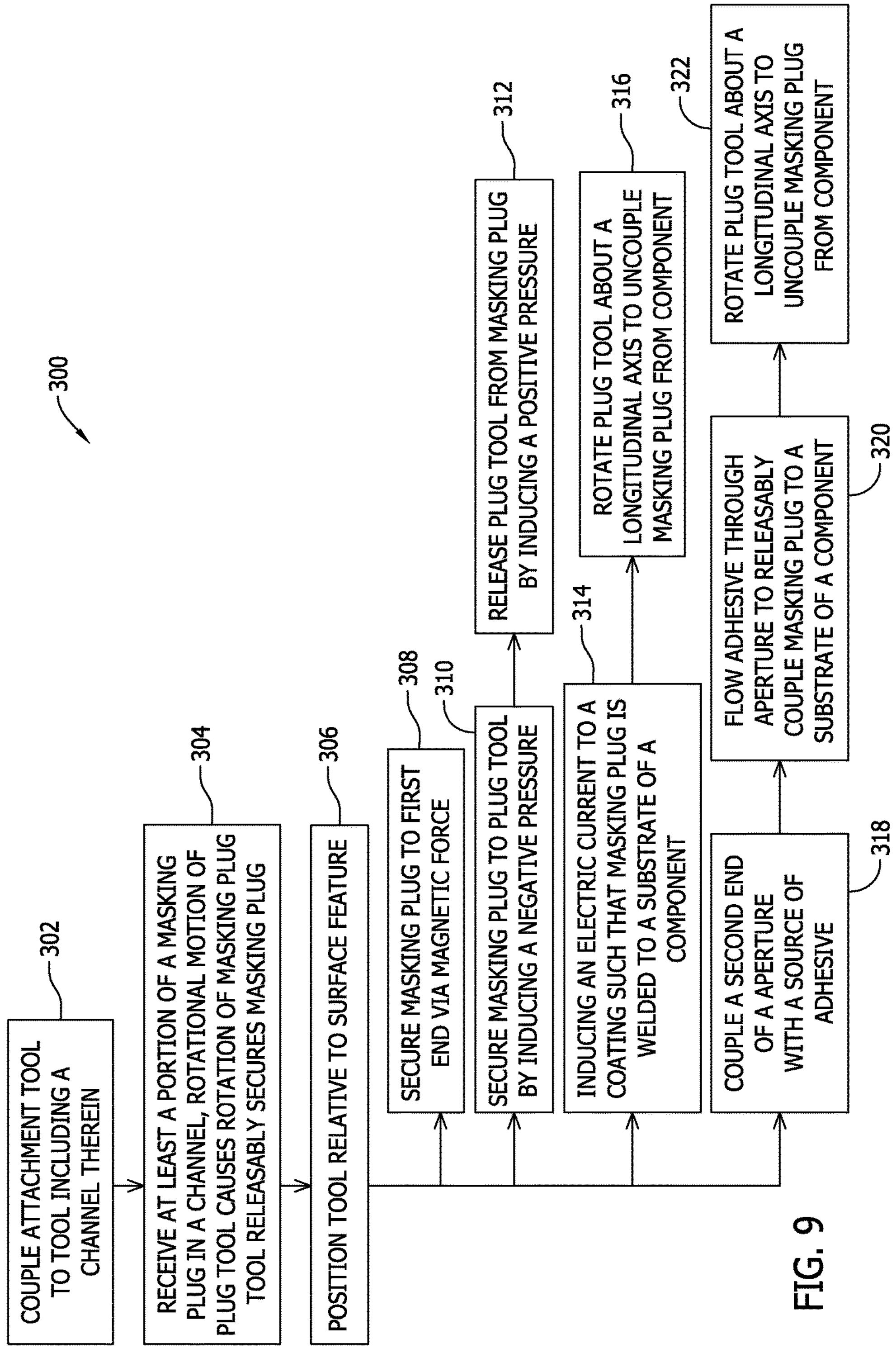
FIG. 9 is a flow diagram of an exemplary method of positioning the masking plug shown in FIG. 3 relative to the surface feature on the component shown in FIG. 3.

An exemplary method 300 of positioning masking plug 150 relative to surface feature 146 on component substrate 140, shown in FIG. 3, is illustrated in the flow diagram of FIG. 9. With reference also to FIGS. 1-8, exemplary method 300 includes coupling 302 attachment tool 220 to a tool 202 including channel 210 therein. Tool 202 extends from first end 206 to and opposite second end 208. Method 300 also includes receiving 304 a portion of masking plug 150 in channel 210 such that rotational motion of tool 202 causes rotation of masking plug 150 and such that masking plug 150 is releasably secure to first end 206. Method 300 further includes positioning 306 tool 202 relative to surface feature 146 on component substrate 140.

In certain embodiments, method 300 includes securing 308 masking plug 150 to first end 206 via magnetic force when masking plug 150 includes a magnetically attractable material and tool 202 includes electromagnetic material 240 adjacent to channel 210.

In some embodiments, method 300 includes securing 310 masking plug 150 to tool 202 by inducing a negative pressure in aperture 222 when aperture 222 is defined in body 204 and in flow communication first end 206 and second end 208. In alternative embodiments, method 300 includes releasing 312 tool 202 from masking plug 150 by inducing a positive pressure in aperture 222.

In certain embodiments, method 300 includes inducing 314 an electric current to a coating such that masking plug 150 is welded to component substrate 140 when surface 224 of body 204 is coated with an electrically-conductive coating. In alternative embodiments, method 300 further includes rotating 316 tool 202 about longitudinal axis 226 such that masking plug 150 secured to first end 206 is rotatably uncoupled from surface feature 146.

In some embodiments, method 300 includes coupling 318 second end 208 of aperture 230 in flow communication with a source of adhesive, such as attachment tool 220 and flowing 320 the adhesive through aperture 230 and out first end 232 of second aperture 230 releasably coupling masking plug 150 to component substrate 140. In alternative embodiments, method 300 further includes rotating 322 tool 202 about longitudinal axis 226 such that masking plug 150 secured to first end 206 is rotatably uncoupled from surface feature 146.

Exemplary embodiments of tools and methods for positioning masking plugs relative to a surface feature on a component are described above in detail. The embodiments described herein provide several advantages in positioning masking plugs. Specifically, the tool and methods described herein facilitate masking and unmasking surface features on components during repair to inhibit obstruction of the surface features. The embodiments described herein provide advantages in that the masking plug is releasably securable to the tool, while an attachment tool, such as but not limited to an end effector, moves the masking plug into a selected position and orientation for coupling to the component. The embodiments also provide an advantage in that the same tool is rotatable to decouple the masking plug from the component, such as after a coating is applied to the substrate. Certain embodiments provide a further advantage in that the tool facilitates releasably coupling the masking plug to the component substrate such that the masking plug is not displaced, for example during the application of the coating to the substrate. Thus, the tools and methods described herein enable a more economical and automated positioning of masking plugs during component repair.

The tools and methods described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the disclosure has been described in terms of various specific embodiments, those skilled in the art will recognize that the disclosure can be practiced with modification within the spirit and scope of the claims. Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, and feature of a drawing may be referenced and/or claimed in combination with any feature of any other drawing.

What is claimed is:

1. A tool for positioning a removable masking plug within a surface feature on a component, said tool comprising:

a body extending from a first end to an opposite second end and defining a longitudinal axis between said first end and said second end, said second end configured to couple to an attachment tool, wherein at least a portion of said body is coated with an electrically-conducted coating, and wherein said second end comprising electrodes configured to selectively apply an electrical current to said body, via the electrically-conductive coating; and a channel defined in said first end, said channel sized to receive at least a portion of the removable masking plug therein such that rotational motion of said tool about the longitudinal axis is transferred to the masking plug, wherein said tool is operable to releasably secure the masking plug to said first end during positioning and removal of the masking plug; and wherein a selective application of electrical current to said body by said electrodes is operable to weld the removable masking plug within the surface feature of the component.

2. The tool in accordance with claim 1, wherein said tool further comprises at least one of:

an electromagnetic material adjacent to said channel, said electromagnetic material configured to secure the removable masking plug to said first end; or a first aperture defined in said body and in flow communication with said first end and said second end, wherein said first end is configured to secure the removable masking plug to said tool in response to a negative pressure induced in said aperture and to release the removable masking plug from said tool in response to a positive pressure induced in said first aperture; or a second aperture defined through said body and extending from the first end to the second end, a first end of said aperture being defined in said first end of said tool, and a second end of said second aperture being configured to couple in flow communication with a source of adhesive, the adhesive being a bonding resin.

3. A system for use in positioning a removable masking plug within a surface feature on a component, said system comprising:

a removable masking plug comprising a first projection configured to extend within the surface feature; and a tool comprising:

a body defining a longitudinal axis, said body having a first end and a second end said second end being configured to couple to an attachment tool, wherein at least a portion of said body is coated with an electrically-conducted coating, and wherein said second end comprising electrodes configured to selectively apply an electrical current to said body, via the electrically-conductive coating; and a channel defined in said first end of said body, said channel sized to receive at least a portion of said removable masking plug therein such that rotation of said tool around the longitudinal axis of said body causes rotation of said masking plug, and wherein said tool is operable to releasably secure said masking plug to said body during initial positioning of said masking plug within the surface feature and subsequently to remove said masking plug from the surface feature; and wherein a selective application of electrical current to said body by said electrodes is operable to weld the removable masking plug within the surface feature of the component after initial positioning.

4. The system in accordance with claim 3, wherein said removable masking plug includes a magnetically attractable material, and said tool further comprises an electromagnetic material adjacent to said channel, said electromagnetic material configured to secure said removable masking plug to said body.

5. The system in accordance with claim 3, wherein said tool further comprises an aperture defined through said body, said body being configured to secure said removable masking plug to said tool in response to a negative pressure induced in said aperture and to release said removable masking plug from said tool in response to a positive pressure induced in said first aperture.

6. The system in accordance with claim 3, wherein said tool further comprises an aperture defined through said body, said aperture oriented to channel an adhesive bonding resin through said body from a source of adhesive bonding resin towards said removable masking plug.

7. The system in accordance with claim 3, wherein said tool is rotatable about said longitudinal axis by the attachment tool to selectively couple and uncouple said removable masking plug from the component.

8. A method of positioning a masking plug within a surface feature on a component, said method comprising:

coupling an attachment tool to a tool configured to engage the masking plug, the tool comprising a body extending from a first end to an opposite second end about a longitudinal axis of the body, the first end comprising a channel therein and the second end cm led to the attachment tool, wherein at least a portion of said body is coated with an electrically-conducted coating, and wherein the second end comprising electrodes configured to selectively apply an electrical current to said body, via the electrically-conductive coating;

receiving at least a portion of the masking plug in the channel, the masking plug being releasably secured to the first end, such that rotational motion of the tool around the longitudinal axis of the body causes rotation of the masking plug; and positioning the tool within the surface feature on the component; and removably installing the masking plug within the surface feature by selectively applying an electrical current to said body to weld the masking plug within the surface feature of the component.

9. The method in accordance with claim 8, wherein the masking plug includes a magnetically attractable material and the tool includes an electromagnetic material adjacent to the channel, said method further comprising securing the masking plug to the first end via magnetic force.

10. The method in accordance with claim 8, wherein an aperture is defined in the body and in flow communication with the first end and the second end, said method further comprising securing the masking plug to the tool by inducing a negative pressure in the aperture.

11. The method in accordance with claim 10, further comprising releasing the masking plug from the tool by inducing a positive pressure in the aperture.

12. The method in accordance with claim 8, further comprising rotating the tool about the longitudinal axis such that the masking plug secured to the first end is rotatably uncoupled from the surface feature.

13. The method in accordance with claim 8, wherein an aperture is defined in the body, a first end of the aperture is defined in the first end of the tool and extends therethrough, said method further comprising: coupling a second end of the aperture in flow communication with a source of adhesive bonding resin; and flowing the adhesive bonding resin through the second aperture and out the first end of the aperture to releasably couple the masking plug to a substrate of the component.

14. The method in accordance with claim 13, further comprising rotating the tool about a longitudinal axis such that the masking plug secured to the first end is rotatably uncoupled from the surface feature.

* * * * *